United States Patent
Obuchi (10) Patent No.: US 6,741,293 B1
(45) Date of Patent: May 25, 2004

(54) DIGITAL AND ANALOG BROADCAST RECEIVER, AND DIGITAL AND ANALOG BROADCAST RECEPTION AND OUTPUT METHOD

(75) Inventor: Masashi Obuchi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/573,231

(22) Filed: May 19, 2000

(30) Foreign Application Priority Data

May 20, 1999 (JP) .......................... 11-140082

(51) Int. Cl.$^7$ ................................. H04N 3/27
(52) U.S. Cl. ................... 348/554; 348/555; 348/731; 455/161.3
(58) Field of Search .................. 348/554, 558, 348/725, 726, 731, 553, 555, 180, 570; 375/340; 455/515, 516, 161.3, 337, 246.1, 134–135, 160.1, 101–103

(56) References Cited

U.S. PATENT DOCUMENTS

| | | | | |
|---|---|---|---|---|
| 5,132,793 A | * | 7/1992 | Hirahata et al. ............ | 358/140 |
| 5,283,653 A | * | 2/1994 | Citta ........................... | 348/725 |
| 5,557,337 A | * | 9/1996 | Scarpa ........................ | 348/558 |
| 5,636,250 A | * | 6/1997 | Scarpa ........................ | 375/321 |
| 5,956,624 A | * | 9/1999 | Hunsinger et al. ............ | 455/65 |
| 6,014,178 A | * | 1/2000 | Jeon et al. ................... | 348/554 |
| 6,091,458 A | * | 7/2000 | Jeon et al. ................... | 348/554 |
| 6,108,044 A | * | 8/2000 | Shin ............................ | 348/555 |
| 6,310,654 B1 | * | 10/2001 | Oku et al. ................... | 348/554 |
| 6,327,000 B1 | * | 12/2001 | Auld et al. .................. | 348/441 |
| 6,337,716 B1 | * | 1/2002 | Yim ............................ | 348/554 |
| 6,369,857 B1 | * | 4/2002 | Balaban et al. ............. | 348/555 |

FOREIGN PATENT DOCUMENTS

| | | |
|---|---|---|
| JP | 6-78232 | 3/1994 |
| JP | 6-205317 | 7/1994 |
| JP | 9-307517 | 11/1997 |
| JP | 10-190499 | 7/1998 |
| JP | 10-224244 | 8/1998 |

* cited by examiner

Primary Examiner—Victor R. Kostak
(74) Attorney, Agent, or Firm—Finnegan, Henderson, Farabow, Garrett & Dunner, L.L.P.

(57) ABSTRACT

A digital TV receiver 2 receives digital TV broadcasts and an analog TV receiver 1 receives analog TV broadcasts. A switching control 6 switches between either digital or analog signals to a speaker 7 and a display 8, according to the conditions of received digital and/or analog broadcast waves. Digital broadcast outputs, such as images, cannot be obtained if the field intensity of received broadcast waves is too low for the application of error correction to them. Even in that event, the present equipment can continue image outputs by switching to the analog broadcast. Preferably, the switching control 6 uses the packet error rate during the demodulation of received digital broadcast signals as the index of the conditions of the received waves to perform an output switch between digital and analog broadcasts, according to the error rate.

23 Claims, 6 Drawing Sheets

DIGITAL AND ANALOG BROADCAST RECEIVER, AND DIGITAL AND ANALOG BROADCAST RECEPTION AND OUTPUT METHOD

BACKGROUND OF THE INVENTION

1. Field of the Invention

The present invention relates to a broadcast receiving device and a broadcast reception and output method, particularly to those that are made adaptable to the conditions of received broadcast waves that change with the move of a mobile body furnished with such equipment by taking advantage of both digital and analog broadcast merits.

2. Description of the Related Art

With digital television broadcasting about to begin in Japan, the development of digital TV receiving equipment for mobile applications is in progress. Japanese Patent Laid-Open Publication No. Hei 9-307517, for example, proposes equipment related to digital television broadcasting. Digital broadcasting has advantages in that digital broadcasting can provide higher quality images and sound over analog broadcasting.

As is well-known, digital TV broadcast receivers assure a higher quality of reception by carrying out error correction. If, however, the electric field of received broadcast waves is below a certain level, error correction cannot be performed and no images can be reproduced. This phenomenon is referred to as a cliff effect. When providing a digital broadcast receiver installed on a mobile body, the field intensity of received broadcast signals change as the body moves. Thus, there is a possibility that the field intensity of a received signal will become so low that no images can be obtained due to the cliff effect.

Analog signals have a demerit that ghosts or blurred colors may occur, due to the affect of multiple paths, even when the power of received broadcast waves is sufficiently large. However, unlike digital broadcasts, analog broadcasts are free from the cliff effect. Even when the field intensity of received broadcast waves becomes low during the move of a mobile body equipped with an analog broadcast receiver, the receiver can continue to generate video and audio outputs, though image and sound quality decrease.

As described above, digital broadcasts have higher quality, but no images can be obtained from them when the field intensity of received broadcast waves is below a certain level. In contrast, analog broadcasts can continue to produce images, no matter how low the field intensity of received broadcast waves becomes low.

SUMMARY OF THE INVENTION

An object of the present invention is to provide a broadcast receiver and a broadcast reception and output method that are adaptable to the conditions of received broadcast waves that change with the move of a mobile body furnished with such equipment through the selective use of digital and analog broadcast characteristics.

The broadcast receiver equipment according to the present invention comprises a digital broadcast receiver portion for receiving at least one digital broadcast channel; an analog broadcast receiver portion for receiving analog broadcasts including a channel for transmitting the same content broadcast as on at least one of the digital broadcast channels that can be received by the digital broadcast receiver portion; a receive condition sensing means for sensing the condition of either or both of the digital and analog broadcast waves received by the digital and analog broadcast receiver potions; a channel selection switch for carrying out channel selection, based on predetermined processing; selection means for selecting either the digital or analog broadcast when the channel selection switch has selected a pair of digital and analog channels from which same content broadcasts are received, according to the conditions of received broadcast waves, as sensed by the receive condition sensing means; and a broadcast output means for outputting the selected broadcast.

In the broadcast receiver of the present invention, when broadcasts of the same content are received from a pair of digital and analog channels which have been selected by the channel selection switch, based on predetermined processing, the selection means selects either the digital or analog broadcast, according to the conditions of either or both of the digital and analog broadcast waves received by the digital and analog broadcast receiver portions, as sensed by the receive condition sensing means, and the broadcast output means outputs the selected broadcast. Thus, the present invention enables selective output of digital or analog signals of better quality, because the broadcast output is switched between the received digital and analog broadcasts, according to the conditions of either or both of the digital and analog broadcast waves received by its digital and analog broadcast receiver portions. The broadcast in the above description can be exemplified by TV broadcasting, but are not limited to this, and any kind of broadcasting, such as radio broadcasting, may be applicable to the present invention. The "predetermined processing" of the channel selection switch includes operation by the user and an automatic search executed when the receiver is powered up.

This broadcast receiver of the present invention may operate so that the receive condition sensing means senses the conditions of the digital broadcast waves received by the digital broadcast receiver portion. If this is implemented, the device can switch over between digital and analog broadcasts to be output, according to the conditions of received digital broadcast waves that produce clearer sound and images.

When the broadcast receiving equipment according to the present invention is intended to perform digital/analog broadcast switching according to the conditions of received digital broadcast waves, its receive condition sensing means may detect the error rate of packets during the demodulation of the received digital broadcast signals as an index of the conditions of the received waves. If this is implemented, the device can easily determine whether the strength of the received digital broadcast is sufficient to obtain output such as images. When operating in this manner, the broadcast receiving equipment of the present invention can be preset so that its selection means selects the digital broadcast if the error rate of packets detected as the index of the conditions of the received digital broadcast waves is less than a predetermined rate or select the corresponding analog broadcast if this error rate is equal to or greater than the predetermined rate.

Alternatively, when the broadcast receiving equipment according to the present invention is intended to perform digital/analog broadcast switching according to the conditions of received digital broadcast waves, its receive condition sensing means may detect the received power level of the received digital broadcast signals as the index of the conditions of the received digital broadcast waves. Because the received power level is closely related to the received wave conditions, more adequate digital/analog broadcast switching can be performed according to the received power level. When operating in this manner, the broadcast receiving equipment of the present invention can be preset so that its digital/analog selection means selects the digital broadcast if the received power level is equal to or higher than a predetermined level or select the corresponding analog broadcast if this level is lower than the predetermined level.

The broadcast receiver of the present invention also may operate so that its receive condition sensing means senses the conditions of the analog broadcast waves received by the analog broadcast receiver portion. If this is implemented, the equipment can switch over between digital and analog broadcasts to be output, according to the conditions of received analog broadcast waves.

In the broadcast receiver according to the present invention, furthermore, the receive condition sensing means may comprise a received video conditions sensing means for sensing the conditions of the video of the received broadcast waves and a received audio conditions sensing means for sensing the conditions of the audio of the received broadcast waves. Moreover, the selection means may comprise a video selection means for selecting either the video of the digital broadcast or the video of the analog broadcast, according to the received video conditions as sensed by the received video condition sensing means, and a audio selection means for selecting either the audio of the digital broadcast or the audio of the analog broadcast, according to the received audio conditions sensed by the received audio condition sensing means. This configuration, if implemented, enables the equipment to selectively output more adequate video as well as audio from either digital or analog broadcasts.

When the broadcast receiver according to the present invention is intended to perform broadcast switching separately for video and audio in the above configuration, its received video condition sensing means may detect the error rate of video packets during the demodulation of the received digital broadcast signals as the index of the received video condition and its received audio condition sensing means may detect the error rate of audio packets during the demodulation of the received digital broadcast signals as the index of the received audio condition. If this is implemented, the equipment can easily determine whether the video and audio obtained from the digital broadcast are adequate. When operating in this manner, the broadcast receiving equipment of the present invention can be preset so that its digital/analog video selection means selects the video of the digital broadcast when the error rate of the video packets detected by the received video conditions sensing means is less than a predetermined rate and select the video of the analog broadcast when this rate is greater than or equal to the predetermined rate and its audio selection means selects the audio of the digital broadcast when the error rate of the audio packets detected by the received audio conditions sensing means is less than a predetermined rate or selects the audio of the analog broadcast signals when this rate is greater than or equal to the predetermined rate.

Alternatively, when the broadcast receiver according to the present invention is intended to perform digital/analog broadcast switching separately for video and audio, its received video conditions sensing means may detect the received power level of the video of the received digital broadcast signals as the index of the received video condition and its received audio conditions sensing means may detect the received power level of the audio of the received digital broadcast signals as the index of the received audio condition. Because the received power level is closely related to the received wave conditions, higher quality video and audio outputs can be obtained from either digital or analog broadcasts according to the received power level. When operating in this manner, the broadcast receiving equipment of the present invention can be preset so that its video selection means selects the video of the digital broadcast if the received power level of the video detected by the received video condition sensing means is greater than or equal to a predetermined level or selects the video of the analog broadcast if this level is below the predetermined level and its audio selection means will select the audio of the digital broadcast if the received power level of the audio detected by the received audio conditions sensing means is greater than or equal to a predetermined level or select the audio of the analog broadcast if this level is below the predetermined level.

Furthermore, when the broadcast receiving equipment according to the present invention is intended to perform broadcast switching separately for video and audio, the received video condition sensing means may detect the conditions of the video of the received analog broadcast signals as the index of the received video condition and its received audio condition sensing means may detect the conditions of the audio of the received analog broadcast signals as the index of the received audio condition. If this configuration is implemented, higher quality video and audio outputs can be obtained from either digital or analog broadcasts, according to the conditions of the received analog broadcast signals.

The broadcast receiver according to the present invention may further include a received channel control means for controlling the digital broadcast receiver and the analog broadcast receiver to receive broadcasts of the same content on a pair of digital and analog channels as selected by the channel selection switch.

Alternatively, the broadcast receiver of the present invention may operate so that its analog broadcast receiver portion receives only the audio of analog broadcasts. In this mode, the receive condition sensing means senses the conditions of the audio of the received broadcast waves, the selection means selects either the audio of the digital broadcast or the audio of the analog broadcast, according to the received audio conditions sensed by the receive condition sensing means. If this operation mode is implemented, video output is obtained from digital broadcasts while and audio output is selectively obtained from whichever of either digital or analog broadcasts is of higher quality.

When the broadcast receiving equipment of the present invention is intended to make digital/analog broadcast selection for audio only, its receive condition sensing means may detect the error rate of audio packets during the demodulation of the received digital broadcast signals as the index of the received audio conditions. In this case, the equipment is preset so that its selection means will select the audio of the digital broadcast if the error rate of the audio packets detected by the received broadcast wave condition sensing means is less than a predetermined rate, or select the audio of the analog broadcast if this error rate is equal to or greater than the predetermined rate.

When the broadcast receiving equipment of the present invention is intended to make broadcast selection for audio only, its received condition sensing means may detect the received power level of the audio of the received digital broadcast signals as the index of the received audio condition. In this case, the equipment is preset so that its selection means selects the audio of the digital broadcast when the received power level of the audio of the received signals is greater than or equal to a predetermined level or selects the audio of the analog broadcast when this level is below the predetermined level.

A broadcast reception and output method according to the present invention comprises the steps of (a) receiving at least one digital broadcast channel and concurrently receiving an analog broadcast including a channel transmitting the same content as on at least one of the digital broadcast channels; and (b), selecting and outputting either a digital or an analog broadcast according to the conditions of the received digital or/and analog signal from a pair of digital and analog signals on which the same content is transmitted and which have been selected for reception.

According to the broadcast reception and output method of the present invention, when a pair of digital and analog of same content signals have been selected for reception, the received digital or analog signal having better wave condition can be output.

Step (b) of the broadcast reception and output method of the present invention can be implemented so that the error rate of packets during the demodulation of the received digital broadcast signals is detected as the index of the condition of the received waves. Then, the digital broadcast will be selected and output when the detected packet error rate is less than a predetermined rate and the analog broadcast will be selected and output when this error rate is greater than or equal to that predetermined rate. Determination as to whether the digital broadcast output is adequate can easily be made using the packet error rate.

Step (b) of the broadcast reception and output method of the present invention can alternatively be implemented so that the received power level of the received digital broadcast signals is detected as the index of the received broadcast wave condition. Then, the digital broadcast will be selected and output if the detected received power level is greater than or equal to a predetermined level or the analog broadcast will be selected and output if this level is lower than the predetermined level. Because the received power level is closely related to the received wave conditions, the better of either the digital or analog broadcast output can be used, according to the received power level.

Step (b) of the broadcast reception and output method of the present invention can further be implemented so that either the video of the digital broadcast or the video of the analog broadcast is selected and output, according to the received wave conditions of the video of the received broadcast waves, and either the audio of the digital broadcast or the audio of the analog broadcast is selected and output according to the received wave conditions of the audio of the received broadcast waves. In this way, more adequate audio and video can separately be output from digital or analog broadcasts.

When the broadcast reception and output method of the present invention will be applied to perform broadcast switching separately for video and audio step (b) may comprise the following sub-steps (b1) and (b2). In sub-step (b1), the error rate of video packets during the demodulation of the received digital broadcast signals is detected as the index of the received video condition. Then, the video of the digital broadcast will be selected and output when the detected error rate of the video packets is less than a predetermined rate or the video of the analog broadcast will be selected and output when this error rate is greater than or equal to the predetermined rate. In sub-step (b2), the error rate of audio packets during the demodulation of the received digital broadcast signals is detected as the index of the received audio conditions. Then, the audio of the digital broadcast will be selected and output when the detected error rate of the audio packets is less than a predetermined rate or the audio of the analog broadcast will be selected and output when this error rate is equal to or greater than the predetermined rate.

When the broadcast reception and output method of the present invention is applied to perform broadcast switching separately for video and audio, step (b) may alternatively comprise the following sub-steps (b1) and (b2). In sub-step (b1), the received power level of the video of the received digital broadcast signals is detected as the index of the received video condition. Then, the video of the digital broadcast will be selected and output when the detected received power level of the video of the received signals is greater than or equal to a predetermined level or the video of the analog broadcast will be selected and output when this level is below the predetermined level. In substep (b2), the received power level of the audio of the received digital broadcast signals is detected as the index of the received audio condition. Then, the audio of the digital broadcast will be selected and output when the detected received power level of the audio of the received signals is greater than or equal to a predetermined level or the audio of the analog broadcast will be selected and output when this level is below the predetermined level.

DESCRIPTION OF THE PREFERRED EMBODIMENT

A preferred embodiment of the present invention will be described below with reference to the drawings. In this embodiment, the present invention is applied to a TV broadcast receiver that is installed on a mobile body, such as a motor vehicle.

Figure 1:
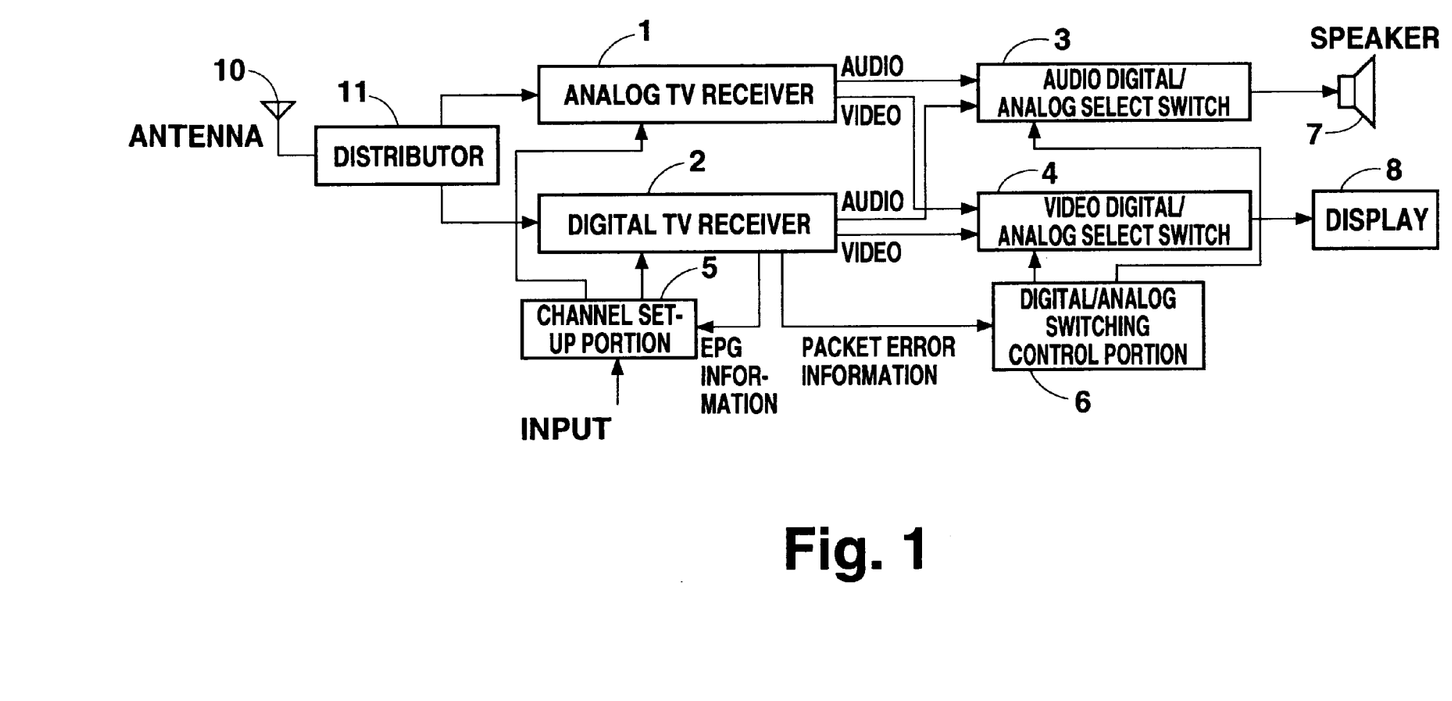
FIG. 1 is a block diagram showing the overall structure of a preferred embodiment of the present invention.

FIG. 1 is a block diagram showing the overall structure of embodiment. As shown in FIG. 1, an analog TV receiver 1 and a digital TV receiver 2 are connected to an antenna 10 via a distributor 11. It would be preferable that the antenna 10 consists of a plurality of antenna elements to perform diversity reception. Alternatively, discrete antennas may be provided, one for each receiver, and the distributor 11 may be removed.

A channel setup portion 5 controls the channels received by the analog TV receiver 1 and the digital TV receiver 2. The channel setup portion 5 tunes both receivers to a pair of analog and digital channels on which the same content is broadcast, as will be detailed later.

Each audio output terminal of the analog TV receiver 1 and the digital TV receiver 2 is connected to an audio select switch 3 to which a speaker 7 is connected. Each video output terminal of both receivers is connected to a video select switch 4 to which a display 8 is connected. Both switches 3 and 4 perform switching action to select either an analog or a digital broadcast.

A switching control portion 6 controls the audio select switch 3 and the video select switch 4. In this embodiment, the switching control portion 6 controls the switching, according to the broadcast wave conditions received by the digital TV receiver 2; it sets the switches 3 and 4 to the digital broadcast when the received digital broadcast wave conditions is good and turns the switches 3 and 4 to the analog broadcast when the received digital broadcast wave conditions deteriorate.

The switching control portion 6 uses packet error information input from the digital TV receiver 2 as the index of the received digital broadcast wave condition. When, for example, MPEG2 encoding is used, the receiver 2 performs error correction for the received data and attaches an error/no error flag to a TS packet. When the data error cannot be completely eliminated from the packet, an error flag is set. This error/no error information is used by the switching control portion 6. When the rate of error occurrence is above a predetermined rate, the switching control portion 6 determines that the received broadcast wave conditions are poor.

The operation of the above equipment is explained below. The antenna 10 receives both analog and digital TV broadcast signals. During the transitional period from analog to digital TV broadcasting, simultaneous analog and digital broadcasting is anticipate; i.e., the same programs will be transmitted on both analog and digital broadcast channels. It is performable the antenna 10 be able to receive both the analog and digital broadcast signals of simultaneous broadcasting.

The distributor 11 distributes the signals received by the antenna 10 to the analog TV receiver 1 and to the digital TV receiver 2. The analog TV receiver 1 demodulates analog broadcast signals and outputs the audio and video of analog broadcasts. The digital TV receiver 2 demodulates digital broadcast signals and outputs the audio and video of digital broadcasts.

The channels to be received by the analog TV receiver 1 and the digital TV receiver 2 are controlled by the channel setup portion 5. The channel setup portion 5 outputs a signal indicating a channel to be received to each receiver as requested by the user input operation. Each receiver sets the channel to be received according to the input signals.

It should be noted that the channel setup portion 5 automatically sets up a pair of analog and digital broadcast channels so that same content broadcasts will be received from the channels. To enable this control, Electric Program Guide (EPG) information is input to the channel setup portion 5 from the digital TV receiver 2. The EPG information is an program information provided through a usage of one program on a digital TV broadcast, indicating the broadcast contents on all channels for all time slots. To the EPG information, further information is added that indicates the analog broadcast channels corresponding to the digital channels for providing same broadcasting programs. By using this information, the channel setup portion 5 sets both receivers to receive a pair of analog and digital channels of same content broadcasts.

The channel setup portion 5 may carry out automatic channel setup with another method instead of using the EPG information. For example, a memory device, may be used to store the digital and analog broadcast channels on which same content broadcasts are transmitted. Based on the stored information, the channel setup portion 5 may automatically set both receivers to receive a pair of analog and digital channels of same content broadcasts.

Referring back to FIG. 1, the demodulated audio from both receivers 1 and 2 is output to the audio select switch 3 and the demodulated video from both receivers is output to the video select switch 4. In other words, analog and digital broadcast audio signals are input to the audio select switch 3 and analog and digital broadcast video signals are input to the video select switch 4. Under control of the switching control portion 6, each select switch 3 and 4 outputs content from either an analog or a digital signal to, respectively, the speaker 7 and the display 8.

Figure 2:
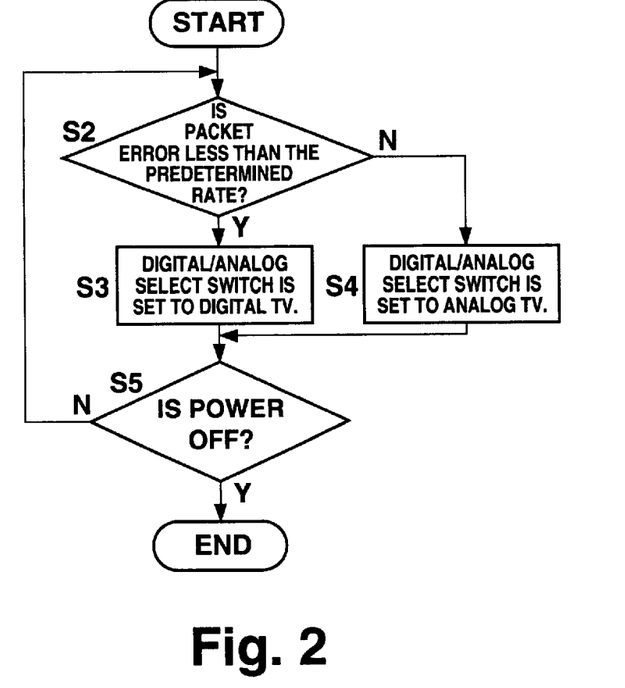
FIG. 2 is a flowchart outlining the operation of the digital/analog switching control portion of the device shown in FIG. 1.

FIG. 2 outlines the operation of the switching control portion 6. First, the switching control portion 6 obtains the rate of packet errors occurring, based on the packet error information input from the digital TV receiver 2, and determines whether this error rate is less than a predetermined rate (S2). This predetermined rate is set at an appropriate value within a range that demodulated data can be obtained, sufficiently enabling the proper reproduction of sound and images from digital broadcast audio and video signals.

If the error rate is below the predetermined rate, as decided in step S2, the audio select switch 3 and the video select switch 4 are set to the digital TV (S3), and images and sound are reproduced on the display 8 and from the speaker 7 from the digital broadcast audio and video.

If the error rate is greater than or equal to the predetermined rate, as decided in step S2, the audio select switch 3 and the video select switch 4 are set to the analog TV (S4), and images and sound from the analog broadcast audio and video are reproduced on the display 8 and from the speaker 7. The above selection processing is repeated until the broadcast receiving equipment is turned OFF (S5).

As regards the processing of S2 in FIG. 2, it may be preferable that the error rate threshold (predetermined rate) used for a switch from analog to digital broadcast be set lower than the threshold for a switch from digital to analog. This can prevent hunting due to frequent switching. For this purpose, some adjustment should also be applied to alternatives to this processing, as will be described later.

Figure 3:
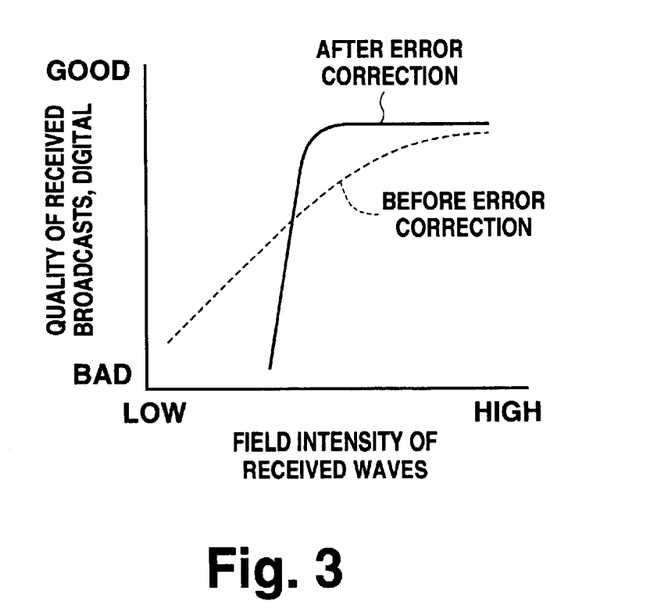
FIG. 3 is a graph showing the relation between the field intensity of received digital broadcast waves and the quality of received digital broadcasts.
Figure 4:
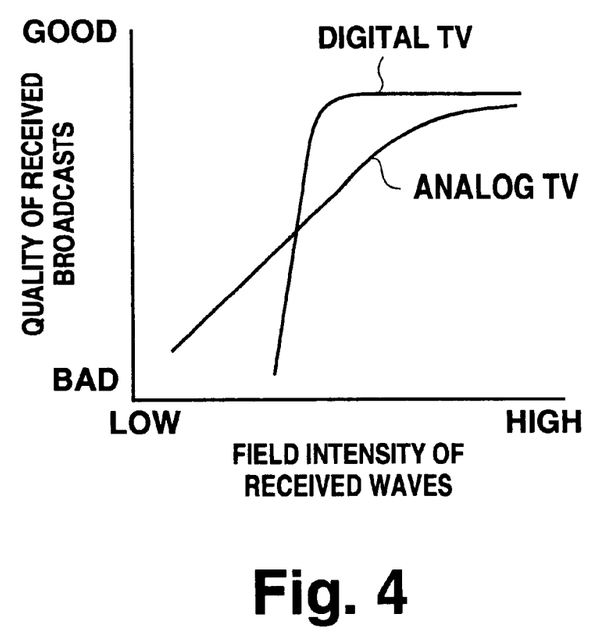
FIG. 4 is a graph comparing the quality of received digital broadcasts and the quality of received analog broadcasts.

With reference to FIGS. 3 and 4, the above switch processing is explained in detail. FIG. 3 shows the relationship between the field intensity of received digital broadcast waves and the quality of received digital broadcasts. The dotted line indicates the quality of received digital broadcasts before error correction, and the solid line indicates that after error correction. Before error correction, the quality of received digital broadcasts decreases as the field intensity of received waves decreases. After error correction, a constant high quality of received digital broadcasts is obtained in the region of higher field intensity. However, when the field intensity falls below a certain level, error correction cannot be performed and the quality of received digital broadcasts degrades steeply, resulting in no output from the broadcasts. This phenomenon is known as the cliff effect, as described earlier.

FIG. 4 shows the quality of received digital broadcasts and the quality of received analog broadcasts together. For analog broadcasts, the quality of received broadcasts gradually decreases as the field intensity of received broadcast waves decreases, because it is free from the cliff effect, unlike digital broadcasts.

Considering the phenomenon shown in FIG. 4, in the embodiment of the present invention, when digital broadcasts are received in the conditions represented by the top of the cliff formed on the line characteristic to digital broadcast waves in FIG. 4, the select switches for outputs are set to the digital broadcast. When the above conditions change to fall over the cliff as the line indicates, or, more desirably, to approach to the edge of the cliff, these switches are set to the analog broadcast. Because of this switching, broadcast outputs do not stop even when the consideration of the received digital signal degrades, and, during normal signal conditions, the higher-quality digital signals are provided.

As described above, this embodiment uses the rate of packet errors occurring as the parameter for representing the conditions of received broadcast waves. This error rate is the number of packet errors occurring per unit time or per unit packet. The higher the field intensity of received broadcast waves is, the lower will the rate of occurrence of packet error. As the field intensity decreases, the error rate increases and eventually error correction becomes impossible (a steep drop of quality occurs, like a fall over a cliff). Thus, the error rate threshold should be preset at a rate that sufficiently admits the proper reproduction of images and sound, or, in other words, that can assure high quality of received digital broadcasts as shown in FIG. 3. Based on the preset error rate threshold, digital/analog broadcast switching can be performed as explained ford FIG. 2.

The broadcast receiver of this example is installed on a mobile body such as a motor vehicle. If the equipment is portable, the receiver itself may be the mobile body. If the mobile body is assumed to be, for example, a motor vehicle, the field intensity of received broadcast waves greatly varies, depending on the area or terrain through which the motor vehicle runs. According to this embodiment, when the field intensity of received waves is high, the video and audio obtained from digital broadcasts are output and therefore higher quality images and sound are reproduced. Even when the motor vehicle runs in an area where the field intensity of received waves is so low as to disable digital broadcast outputs, the equipment switches to analog broadcast output without interrupting the reproduction of images and sound, so that the user can continue to view the broadcast.

As described above, simultaneous analog and digital broadcasting will be carried out during the transitional period from analog to digital broadcasting. To receive this simultaneous broadcasting, it is anticipated that in-vehicle broadcast receiving equipment furnished with both analog and digital TV receivers will be put into practical use. If the present invention is applied to such equipment, the equipment according to the invention can be realized with reduced cost through the effective use of both receivers.

Figure 5:
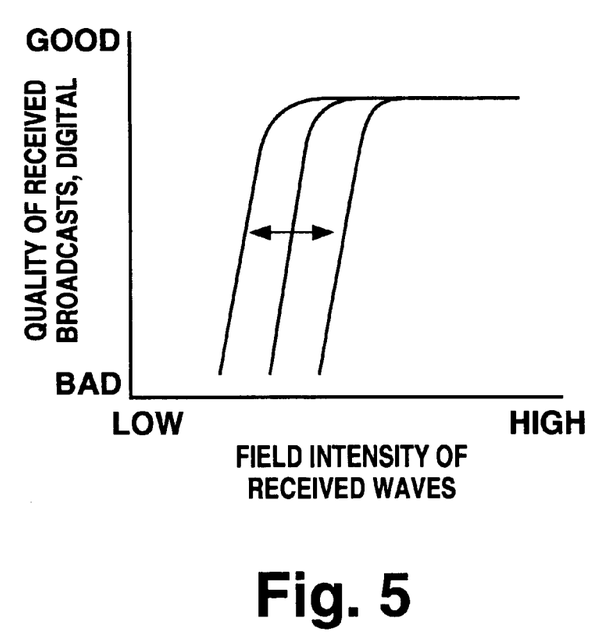
FIG. 5 is a graph explaining the changing quality of received digital broadcasts.

Because the receiver in this embodiment determines the conditions of received digital broadcast waves according to the packet error rate, it can easily judge whether the digital broadcast can be output, as will be explained below. With reference to FIG. 5, it can be seen that the field intensity of received waves at which the cliff effect starts to act on the quality of received digital broadcasts varies depending on the environment where the motor vehicle runs, because of the effect of multiple paths. Moreover, the field intensity itself of received waves varies, depending on the environment around the motor vehicle. Thus, the judgment criterion as to whether the digital broadcast can be output changes, subject to the place-by-place complex factors. However, the use of the packet error rate as the judgment criterion eliminates the need of consideration of these complex factors and enables simple and certain judgment as to whether the digital broadcast can be output.

According to this embodiment, the analog TV receiver 1 and the digital TV receiver 2 are automatically set to receive a pair of analog and digital channels of same content broadcasts and the audio and video of same content broadcasts are output from both receivers. Even after completing out a switch between digital and analog broadcasts, the present invention can provide the same content without confusing the viewers.

Figure 6:
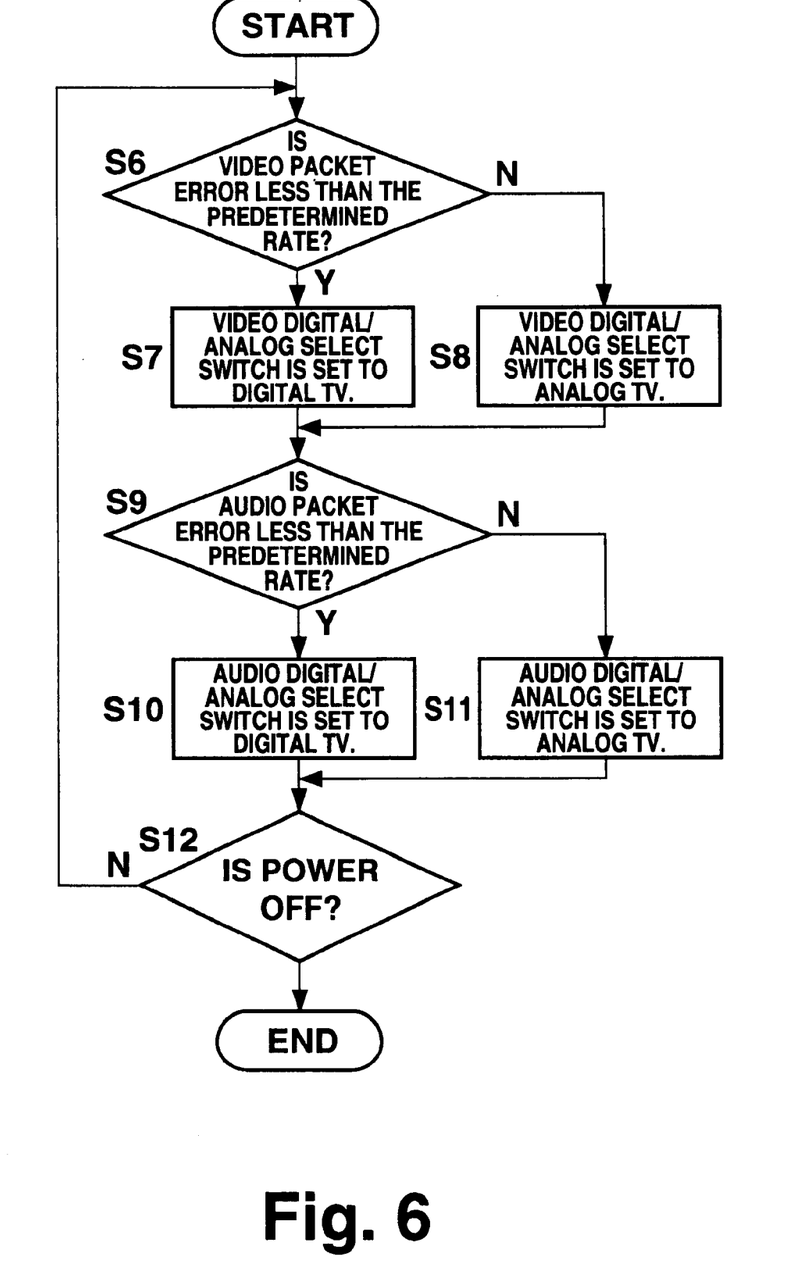
FIG. 6 is a flowchart provided as a modification to the process flow shown in FIG. 2.

Next, FIG. 6 provides a modification to the output switching process executed by the switching control portion 6. In this modification, switching is performed separately for audio and video. The switching control portion 6 obtains the packet error rate during the demodulation of video signals and the packet error rate during the demodulation of audio signals separately.

The switching control portion 6 determines whether the video packet error rate is less than a predetermined rate that is defined as the video error rate threshold (S6). This threshold should be set at a rate that sufficiently admits high quality of images obtained from video signals, or in other words, that corresponds to the received video conditions as represented by the top of the cliff formed on the line characteristic to digital broadcast waves in FIG. 3.

When the error rate is less than the predetermined rate, as decided in the step S6, the video select switch 4 is set to the digital TV (S7) and the video of digital broadcast is output. When the error rate is at or above the predetermined rate, as decided in step S6, the video select switch 4 is set to the analog TV (S8) and the video of analog broadcast is output to the display 8 on which images are reproduced.

Similarly, the switching control portion 6 determines whether the audio packet error rate is less than a predetermined rate which is defined as the audio error rate threshold (S9). This threshold should be set at a rate that sufficiently admits high quality of sound obtained from audio signals, or in other words, that corresponds to the received audio conditions as represented by the top of the cliff formed on the line characteristic to digital broadcast waves in FIG. 3.

When at step S9 the error rate is determined to be less than the predetermined rate, the audio select switch 3 is set to the digital TV (S10) and the audio of digital broadcast is output. When the error rate determined to be at or above the predetermined rate in step S9, the audio select switch 3 is set to the analog TV (S11) and the audio of analog broadcast is output to the speaker 7 from which sound is-reproduced.

The above selection processing explained with FIG. 6 is repeated until the broadcast receiving device is turned OFF (S12).

In the processing explained with FIG. 6, the packet error rate thresholds are set separately for video and audio. Thus, it is possible that one of the audio select switch 3 or the video switch 4 is set to digital while the other switch is set to analog.

This separate switching manner enables selection of digital or analog audio whichever is more adequate and digital or analog video whichever is more adequate.

Figure 7:
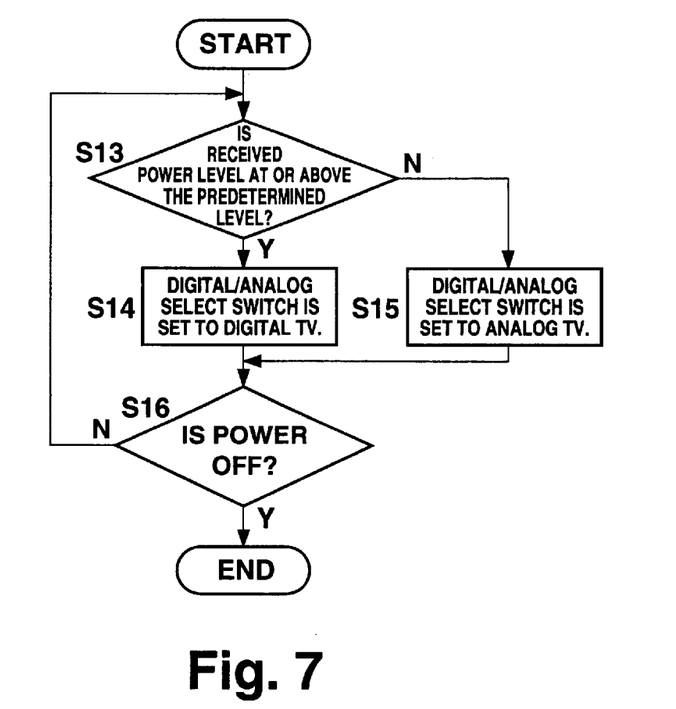
FIG. 7 is a flowchart provided as another modification to the process flow shown in FIG. 2.

Next, the configuration of FIG. 7 provides another modification to the switching process executed by the switching control portion 6. In this modification, as the parameter for representing the conditions of received broadcast waves, the received power level is used instead of the packet error rate. The received power level is a measure of the field intensity of received broadcast waves. For example, Automatic Gain Control (AGC) signals used internally in the digital TV receiver 2 are appropriate indicators of the received power level.

Figure 8:
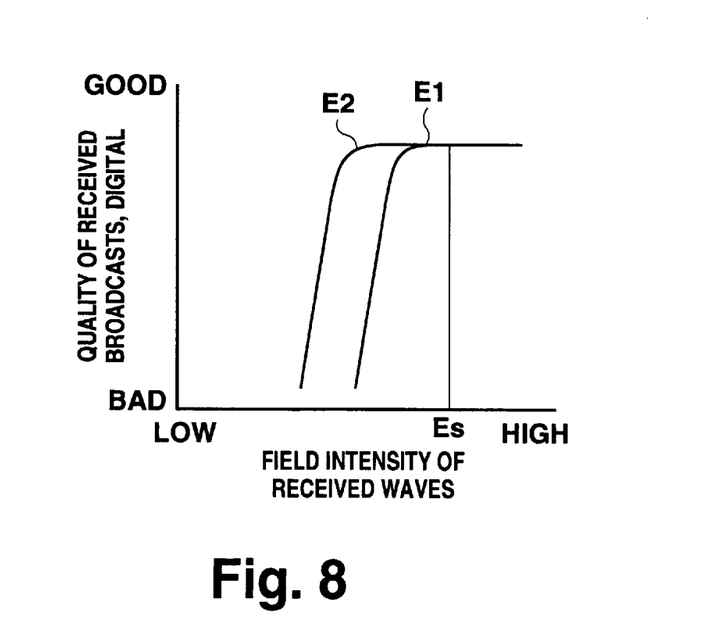
FIG. 8 is a graph explaining the predetermined received power level used for the processing shown in FIG. 7.

To the switching control portion 6, received power level information is input from the digital TV receiver 2. The switching control portion 6 determines whether the received power level is at or above a predetermined level (S13). This predetermined level should be preset as shown in FIG. 8. The field intensity of received digital broadcast waves at which the cliff effect begins to act on the received digital broadcasts varies, depending on the position of a mobile body furnished with the receiver, because of the effect of multiple paths and other factors. Thus, the characteristics of digital broadcast waves shift horizontally as shown in FIG. 8, according to the position of the mobile body. The range of this shift is as shown in normally conceivable environments, i.e., the upper limit of the field intensity range in which the cliff effect occurs is E1 and the lower limit is E2. The predetermined received power level as the threshold for selection should be set at a value corresponding to Es that is a reference field intensity sufficiently high above the upper limit E1.

When the received power level equals or exceeds the predetermined level, as decided in step S13, the audio select switch 3 and the video digital/analog select switch 4 are set to the digital TV (S14), and the digital broadcast video and audio outputs are reproduced on the display 8 and from the speaker 7. When it is decided in step S13 that the receiver power level is less than the predetermined level, the audio select switch 3 and the video select switch 4 are set to the analog TV (S15), and the analog broadcast video and audio outputs are reproduced on the display 8 and from the speaker 7. The above selection processing is repeated until the broadcast receiving equipment is turned OFF (S16).

The device according to the present invention can also be realized through the use of received power level instead of packet error rates, as explained above. By properly presetting the selection threshold of received power level through consideration of the digital broadcast characteristics of place-by-place changing quality of received broadcasts as explained with FIG. 8, appropriate proper broadcast selection and switching can be performed.

As regards the processing of S13 in FIG. 7, it may be advisable that the threshold (predetermined level) used for a switch from analog to digital broadcast be set higher than the threshold for a switch from digital to analog. This can prevent hunting due to frequent switching. In principle, this adjustment produces the same result as done with the adjustment applied to the selection according to the packet error rate, which was described above.

Also for the processing of FIG. 7, it may be advisable that the digital/analog selection threshold of received power level be preset separately for audio and video as in the processing explained for FIG. 6.

As a further modification, the equipment according to the present invention may be embodied to carry out digital/analog selection and switching action using a parameter for representing the conditions of received broadcast waves other than packet error rates or received power level.

In the above description, the conditions of received digital broadcast waves are used as the criteria for digital/analog selection. As implied from FIG. 4, the condition of received analog broadcast waves may also be used as the criterion for digital/analog selection. For example, the received power level of analog broadcasts is referred to and digital/analog selection is made, according to this level. Moreover, the received wave conditions of both analog and digital broadcasts may be referred to for the selection of a digital or an analog broadcast which is appropriate for output.

Figure 9:
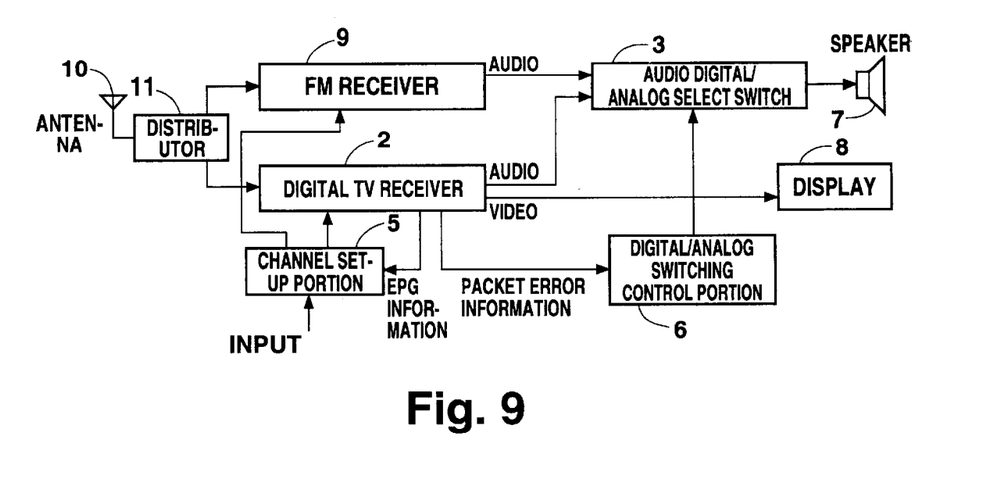
FIG. 9 is a block diagram showing a modification to the equipment shown in FIG. 1.

Next, FIG. 9 provides a modification to the equipment shown in FIG. 1. An FM receiver 9 is installed instead of the analog TV receiver 1, and the video switch 4 is removed, but other components are the same as in FIG. 1.

The FM receiver 9 demodulates only the audio of analog TV broadcasts and outputs audio signals to the audio select switch 3. The digital TV receiver 2 also outputs the demodulated audio signals to this switch 3. Under the control of the switching control portion 6, the audio select switch 3 sends either digital or analog broadcast audio signals to the speaker 7. On the other hand, the digital TV receiver 2 directly outputs video signals to the display 8, as the video switch 4 does not exist. On the display 8, images are reproduced from only the data in the digital broadcasts.

Figure 10:
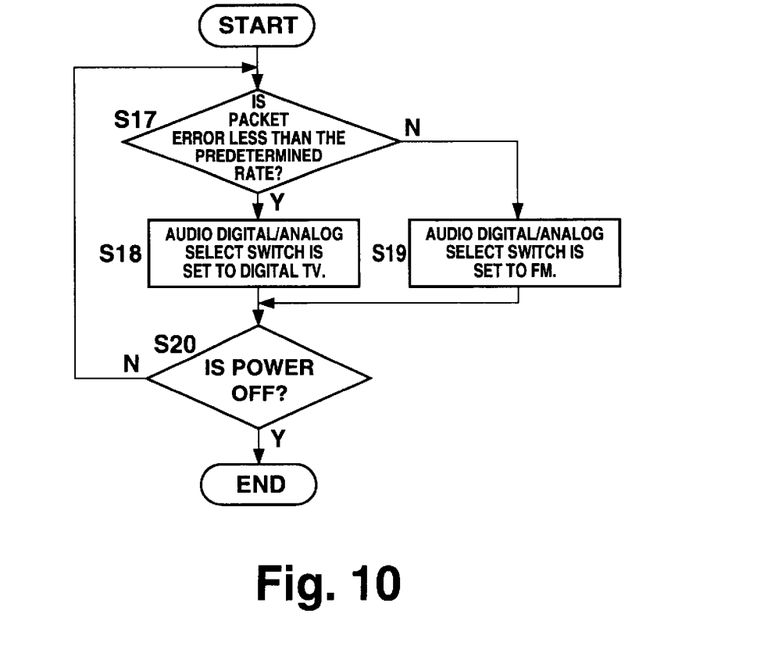
FIG. 10 is a flowchart outlining the operation of the switching control portion of the device shown in FIG. 9.

With reference to FIG. 10, the switching control portion 6 obtains the rate of packet error occurrence based on the packet error information input from the digital TV receiver 2 and determines if the error rate is below a predetermined rate (S17). This predetermined rate corresponds to that used in the step S2 of FIG. 2 or that for audio used in the step S9 of FIG. 6.

When the error rate is less than the predetermined rate, as decided in the step S17, the audio select switch 3 is set to the digital TV (S18) and the digital broadcast audio output is reproduced from the speaker 7. If the error rate is at or above the predetermined rate, as decided in the step S17, the audio select switch 3 is set to the analog TV (S19) and the analog broadcast audio output is reproduced from the speaker 7. This selection processing is repeated until the power of the broadcast receiving equipment is turned OFF (S20).

The equipment configured as shown in FIG. 9 has the following advantages. Digital/analog selection and switching are performed only for audio signals in this configuration, and the structure of the equipment is simplified. Viewers watching TV broadcast on a receiver installed on a mobile body tend to be more sensitive to sound interruption than to image interruption. This tendency is especially significant in environments such as inside a moving motor vehicle. The equipment, as configured in FIG. 9, has the audio signal switching function that prevent sound interruption which is especially a problem for mobile bodies. Thus, a equipment can be simplified device can be provided with necessary functionality at a reduced cost.

Desirably, the FM receiver 9 in FIG. 9 is also used as a radio broadcast receiver. The present invention may be applied to, for example, motor-vehicle-use audio equipment provided with an analog radio and a digital TV by adding the configuration of the switching control portion 6 and the audio select switch 3 shown in FIG. 9 to this equipment. In this way, the equipment of the present invention is realized at a reduced cost with a simple structure.

Should analog audio broadcasting continue after the termination of simultaneous analog and digital broadcasting during the transitional period from analog to digital broadcasts, the broadcast receiving device configured in FIG. 9 can function as a suitable receiver.

The preferred embodiment and modifications of the present invention as explained above can, of course, be modified by any manufacturer within the scope of the present invention. For example, TV broadcasts may be either terrestrial or satellite broadcasting. Digital and analog broadcasts may be originated from a same site or different sites. The present invention can be applied to equipment for receiving broadcasts other than TV broadcasts.

What is claimed is:

1. A broadcast receiving device comprising:

a digital broadcast receiver portion for receiving at least one digital broadcast channel;

an analog broadcast receiver portion for receiving, concurrently with receiving said at least one digital broadcast channel by said digital broadcast receiver portion, analog broadcast signals including a channel transmitting the same content as on said at least one digital broadcast channel received by said digital broadcast receiver portion;

a receive condition sensing means for sensing the condition of either or both of the digital and analog broadcast signals received by said digital broadcast receiver portion and said analog broadcast receiver portion;

a channel selection switch for carrying out channel selection, based on predetermined processing;

a selection means for selecting either said digital broadcast signal or said analog broadcast signal when said channel selection switch has selected a pair of digital and analog channels on which the same content is broadcast, according to the conditions of the received broadcast signals sensed by said receive condition sensing means; and a broadcast output means for outputting the selected broadcast signal.

2. The broadcast receiving device according to claim 1, wherein said receive condition sensing means senses the conditions of digital broadcast signals received by said digital broadcast receiver portion.

3. The broadcast receiving device according to claim 2, wherein said receive condition sensing means detects the error rate of packets during the demodulation of received signals of said digital broadcast as the index of the condition of the received signals of said digital broadcast.

4. A broadcast receiving device according to claim 3, wherein said selection means selects the digital broadcast when the packet error rate detected as the index of the received wave condition of said digital broadcast is less than a predetermined rate and the analog broadcast when the packet error rate is greater than the predetermined rate.

5. A broadcast receiving device according to claim 2, wherein said receive condition sensing means detects the received power level of the received signals of said digital broadcast as the index of the received wave condition of said digital broadcast.

6. A broadcast receiving device according to claim 5, wherein said selection means selects the digital broadcast when the received power level detected as the index of the received signal condition of said digital broadcast is greater than a predetermined level and the analog broadcast when the received power level is less than the predetermined level.

7. A broadcast receiving device according to claim 1, wherein said receive condition sensing means senses the conditions of analog broadcast signals received by said analog broadcast receiver portion.

8. A broadcast receiving device according to claim 1, wherein:

said receive condition sensing means comprises a received video conditions sensing means for sensing the conditions of video of the received broadcast signals and a received audio conditions sensing means for sensing the conditions of audio of the received broadcast signals; and said selection means comprises a video selection means for selecting either the video of the digital broadcast or the video of the analog broadcast, according to the received video conditions sensed by said received video conditions sensing means, and an audio selection means for selecting either audio of the digital broadcast signal or audio of the analog broadcast signal, according to the received audio conditions sensed by said received audio conditions sensing means.

9. A broadcast receiving device according to claim 8, wherein:

said received video condition sensing means detects an error rate of video packets during demodulation of the received signals of said digital broadcast as the index of said condition of the video of the received broadcast signals; and said received audio condition sensing means detects an error rate of audio packets during demodulation of the received signals of said digital broadcast as the index of said condition of the audio of the received broadcast signals.

10. A broadcast receiving device according to claim 9, wherein:

said video selection means selects the video of the digital broadcast when the video packet error rate detected by said received video conditions sensing means is less than a predetermined rate and the video of the analog broadcast when the video packet error rate is greater than the predetermined rate; and said audio selection means selects the audio of the digital broadcast when the audio packet error rate detected by said received audio conditions sensing means is less than a predetermined rate and the audio of the analog broadcast when the audio packet error rate is greater than the predetermined rate.

11. A broadcast receiving device according to claim 8, wherein:

said received video conditions sensing means detects a received power level of the video of the received signals of said digital broadcast as the index of said condition of the video of the received broadcast waves; and said received audio conditions sensing means detects a received power level of the audio of the received signals of said digital broadcast as the index of said condition of the audio of the received broadcast waves.

12. A broadcast receiving device according to claim 11, wherein:

said video selection means selects the video of the digital broadcast when the received power level of the video detected by said received video conditions sensing means is greater than a predetermined level and the video of the analog broadcast when the received power level of the video is less than the predetermined level; and said audio selection means selects the audio of the digital broadcast when the received power level of the audio detected by said received audio conditions sensing means is greater than a predetermined level and the audio of the analog broadcast when the received power level of the audio is less than the predetermined level.

13. A broadcast receiving device according to claim 8, wherein:
  said received video conditions sensing means senses the conditions of received video signals of said analog broadcast as said conditions of the video of the received broadcast waves; and
  said received audio conditions sensing means senses the conditions of received audio signals of said analog broadcast as said conditions of the audio of the received broadcast waves.

14. A broadcast receiving device according to claim 1, further comprising a received channel control means for controlling said digital broadcast receiver portion and said analog broadcast receiver portion to receive same content broadcasts when said channel selection switch has selected said pair of digital and analog channels broadcasting a same content.

15. A broadcast receiving device according to claim 1, wherein said same content broadcasts are TV broadcasts.

16. A broadcast receiving device according to claim 1, wherein:
  said analog broadcast receiver portion receives only audio of said analog broadcast signal;
  said receive condition sensing means senses the conditions of audio of the received broadcast signals; and
  said selection means selects either audio of the digital broadcast or the audio of the analog broadcast, according to the conditions of the audio of the received broadcast signals, as sensed by said receive condition sensing means.

17. A broadcast receiving device according to claim 16, wherein:
  said receive condition sensing means detects error rate of audio packets during demodulation of the received signals of said digital broadcast as the index of said condition of the audio of the received broadcast signals; and
  said selection means selects the audio of the digital broadcast when an audio packet error rate detected by said receive condition sensing means is less than a predetermined rate and the audio of the analog broadcast when the audio packet error rate is greater than the predetermined rate.

18. A broadcast receiving device according to claim 16, wherein:
  said receive condition sensing means detects a received power level of the received audio signals of said digital broadcast as an index of said conditions of the audio of the received broadcast waves; and
  said selection means selects the audio of the digital broadcast when the received power level of the received audio signals detected by said received broadcast wave conditions sensing means is greater than a predetermined level and the audio of the analog broadcast when the received power level of the received audio signals is less than the predetermined level.

19. A broadcast reception and output method comprising the steps of:
  (a) receiving at least one digital broadcast channel and concurrently receiving analog broadcasts that include a channel transmitting the same content as broadcast on at least one of the digital broadcast channels that can be received by said digital broadcast receiver portion; and
  (b) selecting and outputting either said digital or analog broadcast, according to conditions of received waves of said digital and/or analog broadcasts when a pair of said digital and analog channels broadcasting the same content have been selected for reception,
    wherein said step (b) further includes the steps of detecting an error rate of packets during demodulation of received signals of said digital broadcast as an index of said condition of the received waves, and selecting and outputting the digital broadcast when the detected packet error rate is less than a predetermined rate and the analog broadcast when the packet error rate is greater than the predetermined rate.

20. A broadcast reception and output method comprising the steps of:
  (a) receiving at least one digital broadcast channel and concurrently receiving analog broadcasts that include a channel transmitting the same content as broadcast on at least one of the digital broadcast channels that can be received by said digital broadcast receiver portion; and
  (b) selecting and outputting either said digital or analog broadcast, according to conditions of received waves of said digital and/or analog broadcasts when a pair of said digital and analog channels broadcasting the same content have been selected for reception,
    wherein said step (b) further includes the steps of detecting a received power level of the received signals of said digital broadcast as an index of said condition of received waves, and selecting and outputting the digital broadcast when the detected received power level is greater than a predetermined level and the analog broadcast when the received power level is less than the predetermined level.

21. A broadcast reception and output method comprising the steps of:
  (a) receiving at least one digital broadcast channel and concurrently receiving analog broadcasts that include a channel transmitting the same content as broadcast on at least one of the digital broadcast channels that can be received by said digital broadcast receiver portion, and
  (b) selecting and outputting either said digital or analog broadcast, according to conditions of received waves of said digital and/or analog broadcasts when a pair of said digital and analog channels broadcasting the same content have been selected for reception,
    wherein said step (b) further includes the steps of selecting and outputting either video of the digital broadcast or video of the analog broadcast according to the received video conditions of said conditions of received waves, and selecting and outputting either audio of the digital broadcast or audio of the analog broadcast according to the received audio conditions of said conditions of received waves.

22. A broadcast reception and output method according to claim 21, wherein said step (b) further includes the steps of:
  (b1) detecting an error rate of video packets during demodulation of received signals of said digital broadcast as an index of said received video condition, and selecting and outputting the video of the digital broadcast when the detected error rate of the video packets is less than a predetermined rate and the video of the analog broadcast when the error rate of the video packets is greater than the predetermined rate; and
  (b2) detecting an error rate of audio packets during the demodulation of received signals of said digital broadcast as the index of said received audio condition, and selecting and outputting the audio of the digital broadcast when the detected error rate of the audio packets is less than a predetermined rate and the audio of the analog broadcast when the error rate of the audio packets is greater than the predetermined rate.

23. A broadcast reception and output method according to claim 21, wherein said step (b) further includes the steps of:

(b1) detecting a received power level of the received video signals of said digital broadcast is detected as an index of said received video conditions, and selecting and outputting the video of the digital broadcast when the detected received power level of the received video signals is greater than a predetermined level and the video of the analog broadcast when the received power level of the received video signals is less than the predetermined level; and (b2) detecting a received power level of the received audio signals of said digital broadcast as the index of said received audio condition, and selecting and outputting the audio of the digital broadcast when the detected received power level of the received audio signals is greater than a predetermined level and the audio of the analog broadcast is selected and output when the received power level of the received audio signals is less than the predetermined level.

* * * * *